UNITED STATES PATENT OFFICE.

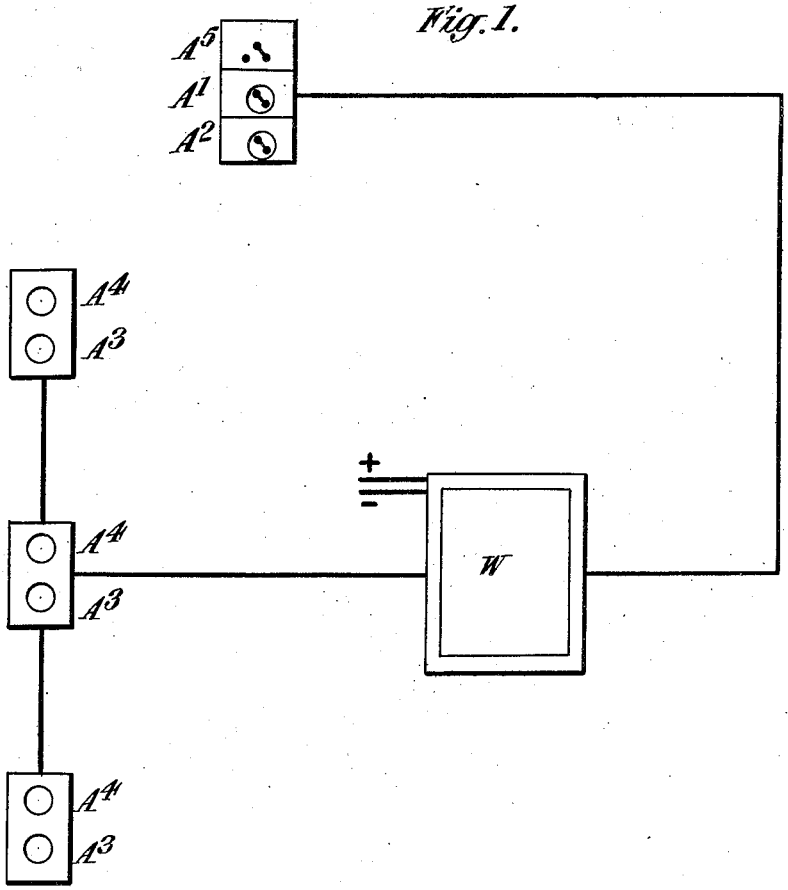

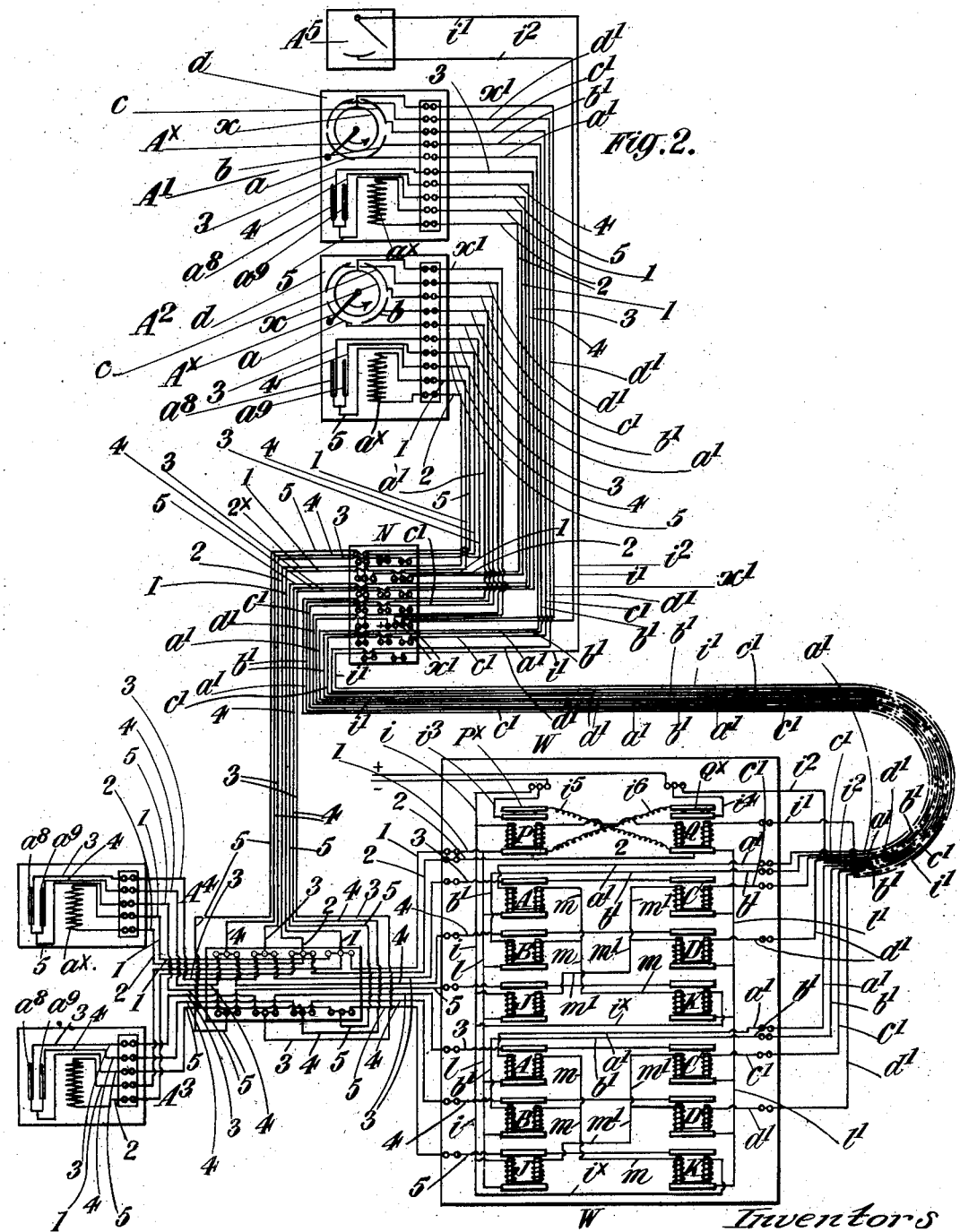

CHARLES SALMON AND HENRY JAMES CREFFIELD, OF ERITH, ENGLAND, ASSIGNORS TO VICKERS SONS & MAXIM LIMITED, OF WESTMINSTER, ENGLAND.

ELECTRICAL APPARATUS FOR TRANSMITTING SIGNALS.

No. 896,584.  Specification of Letters Patent.  Patented Aug. 18, 1908.

Application filed October 23, 1906. Serial No. 340,200.

*To all whom it may concern:*

Be it known that we, CHARLES SALMON and HENRY JAMES CREFFIELD, subjects of the King of Great Britain, residing, respectively, at Oakhurst, Erith, and Faraday House, Erith, both in the county of Kent, England, have invented certain new and useful Improvements Relating to Electrical Apparatus for Transmitting Signals, of which the following is a specification.

This invention relates to electrical signaling apparatus which is particularly intended for gunnery purposes and which is of the kind set forth in the specification of the United States application for patent filed on the 27th November 1905, Serial No. 289,242, said apparatus being intended for transmitting from the conning tower of a ship or other fixed point the necessary information as regards range and deflection to a number of receiving instruments situated contiguous to the guns, so that the officer in charge can transmit such information from the conning tower to the sighting numbers of the various guns' crews simultaneously. The apparatus disclosed in this prior specification comprises a dynamo-electric transmitting instrument at the sending station and a dynamo-electric receiving instrument at each of the receiving stations, each of the instruments being furnished with a counting device mechanically connected with its armature, the said dynamo-electric instruments being of the kind in which the armatures are caused to rotate by electric impulses sent through the armature windings. The windings of the various armatures are electrically connected together through a circuit including a rotary hand switch and segmental contacts at the sending station, so that when said hand switch is revolved, a step by step rotation will be imparted to the various armatures by the electrical impulses sent through the circuit, and as a consequence the counting devices which are mechanically connected with the armatures, will also be caused to perform a similar step by step rotation in unison or synchronously in all the instruments. One set of instruments and circuits is used for sending and receiving the range signals and another set for sending and receiving the deflection signals, each transmitting instrument being provided with a rotary hand switch. An additional hand switch is also provided at the sending station for reversing the direction of the current through the various instruments and thus influencing the position of an indicator for notifying to the receiving stations when their instruments are about to be worked and the attention of the guns' crews is to be given to them.

In the aforesaid arrangement the transmitting instruments have necessarily to be placed in a position of observation and command viz.: in the conning tower as above stated, and the receiving instruments have necessarily to be placed at widely different points in the ship and at considerable distances from the transmitting instruments. Consequently the arrangement involves a long system of wiring of heavy section between the transmitting instruments and the various receiving instruments, and as the latter are situated at varying distances from the transmitting instruments, the conducting wires employed are of varying lengths, which has the effect of causing a considerable fall in the voltage of the main circuit at the various receiving instruments. Moreover this varying length in the different wires also causes the fall in the voltage at some of the receiving instruments to be greater than at others, with the result that there exists a certain lag of one receiving instrument behind the other, which gives rise to the liability of errors occurring in the signals received.

It is the chief object of our invention to overcome the above stated objections, due to the aforesaid system of wiring, by providing at a point as near as possible to the center of the system comprising the group of receiving instruments, an intermediate transmitter, with which the various conducting wires of the rotary hand switches at the sending station and the various conducting wires of the transmitting and receiving instruments are connected. As all the more extensive wiring will be between this intermediate transmitter and the receiving instruments, it will have the effect of equalizing the lengths of wires, so that the undue fall in voltage and its variation at the different receiving instruments above mentioned will be avoided. The said transmitter is constructed with numerous electro-magnetic switches which are electrically connected with the rotary hand switches of the transmitting instruments and with the receiving instruments, in such manner that the actuation of the rotary hand switches causes the electro-magnetic switches to be operated in the proper order for causing the armatures and counting devices of the various receiving instruments to be moved in synchronism with each other and with the armatures and counting devices of the transmitting instruments.

A peculiarity of the electro-magnetic switches is that they close the circuits they control by providing a path for the current through their cores, bases and armatures when the latter are attracted by the excitation of the switch-windings.

We will now describe our invention more fully with reference to the accompanying drawings, in which:—

Figure 1 is a diagrammatic view showing generally the relative arrangement of the various instruments. Fig. 2 is a diagrammatic view showing the arrangement in more detail and also the various electrical connections.

$A'$ is the range transmitting instrument, and $A^2$ the deflection transmitting instrument, both of which are situated at the sending station which, as aforesaid, may be the conning tower of a ship.

$A^3$ $A^4$ are the range and deflection receiving instruments which in practice are inclosed in a single casing for convenience. The number of these receiving instruments employed depends of course upon the number of guns with which they are used. In the present case, for sake of example, three are shown in Fig. 1. They are affixed to the various gun mountings, or other suitable points contiguous to the guns, in positions to be readily observed by the sighting numbers of the guns' crews.

Each of the transmitting and receiving instruments is of the dynamo-electric type i. e. it has a magnet excited by field windings $a^\times$ $a^\times$ and an armature capable of intermittent rotation in the magnetic field. Each armature preferably has two pairs of poles and two independent windings $a^8$ $a^9$ as described in the aforesaid prior specification, the said armature being mechanically connected to a counting device situated contiguous to the armature as explained in the said prior specification.

The range and deflection transmitting instruments $A'$ $A^2$ are each provided with a rotary hand switch $A^\times$, which is adapted to work over concentric rings of which the inner one $x$ is continuous and the outer one divided into four independent segments $a\ b\ c\ d$. A hand switch $A^5$ is also provided at the sending station for controlling the aforesaid indicators of the receiving instruments by altering the direction of the electric current through the field windings of the various instruments and thus notifying at the receiving stations when the firing is about to commence. This switch we term the "fire control switch".

It will be understood that all of the field windings of the various range transmitting and receiving instruments are electrically connected together in series, as also are the field windings of the deflection transmitting and receiving instruments and that when the hand switch appertaining to the range instruments or to the deflection instruments is revolved, it will cause the armatures of the said instruments and their counting devices to work simultaneously in synchronism.

W is the intermediate transmitter which is situated, as above stated, at a point as near as possible to the center of the system comprising the group of receiving instruments. $+$ and $-$ are the electric mains for supplying current through the said intermediate transmitter W to the entire system. This transmitter has three groups of electro-magnetic switches; one group comprising two switches P Q for the fire control, one group comprising six switches A B C D J K for the deflection control, and the other group also comprising six switches (similarly lettered) for the range control. The said switches J and K we will term additional switches for sake of distinguishing them from the other switches A B C D.

The two switches P and Q of the fire control portion of the transmitter have their coils wound in series, one end being connected to the negative main through the conductor $i$, and the other end being connected to the fire control hand switch $A^5$ through the conductors $i'$, $i^2$ to the positive main. The armatures of the switches P and Q are respectively connected to the negative and positive mains by the conductors $i^3$ $i^4$. When the coils of the switches P and Q are excited, by the closing of the fire control hand switch $A^5$, their armatures are attracted, and the current passes through the cores and bases of these switches into the field windings $a^\times$ of the receivers, which windings are connected to the cores by the conductors 1, 2. When the fire control hand switch $A^5$ is opened as shown in Fig. 2, the current is cut off from the coils of the switches P Q, and their armatures are then pulled back by springs, thus breaking contact with the cores. The armatures then press against contact pieces $P^\times$ $Q^\times$ which are in opposite electrical connection with the bases and cores of the switches by the conductors $i^5$ $i^6$. The current then passes to the bases of the switches P Q in the reverse direction to that which takes place when the cores of these switches are excited, consequently the current in the field windings $a^\times$ is reversed and the fire control indicator shifted. As the current in the bases of the other electro-magnetic switches supplying current to the rotary armatures $a^8$ $a^9$ is reversed at the same time, the aforesaid movement of the hand switch $A^5$ makes no difference to the direction in which the rotary armatures revolve.

The two groups of electro-magnetic switches of the deflection and the range control portions of the transmitter are identically arranged, so that a description of one group will apply equally well to the other, like letters being used to designate similar parts in both groups. We will therefore only describe in detail the deflection portion of the intermediate transmitter.

The bases of three of the electro-magnetic switches viz.: A B J, are connected with the base of the electro-magnetic switch P through the conductor $l$, and the bases of the other three electro-magnetic switches, viz.: C D K, are connected with the base of the electro-magnetic switch Q through the conductor $l'$. One end of the coils of the switch A is connected with the conductor $a'$ leading to the section $a$ of the hand switch $A^\times$ and the other end of said coils is connected by the conductor $m$ with one end of the coils of the switch K, the opposite end of the coils of this switch being connected by the conductor $i^\times$ with the conductor $i$ leading to the negative main. One end of the coils of the switch B is connected with the conductor $b'$ leading to the section $b$ of the hand switch $A^\times$ and the other end of said coils is connected by the said conductor $m$ with the coils of the switch K and through the latter with the said conductors $i^\times$ and $i$ leading to the negative main. One end of the coils of the switch C is connected with the conductor $c'$ leading to the section $c$ of the hand switch $A^\times$ and the other end of said coils is connected by the conductor $m'$ with one end of the coils of the switch J, the opposite end of the coils of this switch being connected by means of the conductor $i$ to the negative main. One end of the coils of the switch D is connected with the conductor $d'$ leading to the section $d$ of the hand switch $A^\times$ and the other end of said coils is connected by the said conductor $m'$ with the coils of the switch J and through the latter with the said conductor $i$ leading to the negative main. The armature of the switch A is electrically connected with the armature of the switch C and with the conductor 3 leading to the rotary armatures of the range transmitting and receiving instruments. The armature of the switch B is electrically connected with the armature of the switch D and with the conductor 4 leading to the rotary armatures of the range transmitting and receiving instruments. The armature of the switch J is electrically connected with the armature of the switch K, and with the conductor 5 leading to the rotary armatures of the range transmitting and receiving instruments.

The working of the apparatus can now be readily understood. We will describe the working of the deflection transmitter and we will assume that the fire-control hand switch $A^5$ is in the position shown in Fig. 2, in which the armatures of the electro-magnetic switches P Q are unattracted and lie in electrical connection with the contact pieces $P^\times$ $Q^\times$ as shown in this figure. The current then flows from the positive main through the conductor $i^4$ to the armature of the switch Q and the contact-piece $Q^\times$, thence through the conductor $i^6$ to the base of the switch P, thence through the conductors 1 to the field windings $a^\times$ of the various range receiving and transmitting instruments whereby their field magnets are excited. The current then flows through the conductors 2 to the base of the switch Q, thence through the conductor $i^5$ to the contact piece $P^\times$ and the armature of the switch P and thence through the conductor $i^3$ to the negative main.

In the position in which the rotary hand switch $A^\times$ of the deflection transmitter is shown, the current will flow from the positive main through the conductor $i^2$ to the junction box N and, as the circuit $i'$ $i^2$ through the fire control hand switch $A^5$ is open, the current will pass from said junction box through the conductor $x'$ to the inner ring $x$ of the said rotary hand switch $A^\times$. Thence the current flows through the rotary hand switch to the section $a$ of the outer ring and through the conductors $a'$ to the coils of the electro-magnetic switch A. After passing through said coils and the conductor $m$, it reaches the coils of the switch K. It passes through said coils and reaches the conductors $i^\times$ and $i$, through which said current flows to the negative main thus completing the circuit. The armatures of the switches A and K are thus attracted by the excited coils of the switches, with the result that current then flows through the conductor $l$ from the positive main (by way of the base of the switch P as explained above) to the base of the switch A. Thence it flows through the cores and armatures of this switch to the conductors 3, thus reaching the armature windings $a^8$ of the various range receiving and transmitting instruments. After flowing through these armature windings $a^8$, the current passes through the conductors 5 to the armatures of the switches J and K. From the latter armature, which as stated above has been attracted by its electro-magnet, the current flows through the cores and base of this switch to the conductor $l'$, thus reaching the base of switch Q, whence it passes through the conductors $i^5$ and $i^3$ to the negative main. The current in thus flowing causes the rotary armatures of all the deflection instruments to turn one step and actuate their counting devices accordingly. When the said rotary hand switch $A^\times$ of the deflection transmitter is turned another step in the direction of the arrow, so as to join the ring $x$ with the segment $b$, the current is first cut off from the coils of the switches A and K and the armatures of these switches resume their open position under the action of springs, then said current flows through the hand switch to the segment $b$ and thence through the conductors $b'$ to the coils of the switch B. It passes through these coils and the conductor $m$ and again reaches the coils of the switch K. After flowing through these coils it passes through the conductors $i^\times$ and $i$ to the negative main. The switches B and K will thus attract their armatures, with the result that current then flows from the conductor $l$ through the base and cores of the switch B to the armature of this switch and thence through the conductors 4 to the windings $a^9$ of the rotary armatures of the various range receiving and transmitting instruments. From these armature windings the current then flows through the conductors 5 to the armatures of the switches J and K. From the latter armature (which has been attracted by its magnet as stated above) the current flows through the cores and base of the switch K to the conductor $l'$ and thence to the negative main as before. The various rotary armatures of the deflection receiving and transmitting instruments will thus be caused to turn another step. Similarly when the hand switch $A^\times$ of the deflection transmitter is moved a further step in the same direction as the arrow, it will join the ring $x$ with the segment $c$. The current will then be cut off from the switches B and K and their armatures will resume their open position under the action of springs; then the current will flow from the ring $x$ through the rotary switch $A^\times$ to the segment $c$. Thence it will flow through the conductors $c'$ to the coils of the switch C. After passing through these coils it passes through the conductor $m'$ and the coils of the switch J to the conductor $i$, and thus to the negative main. The armatures of the switches C and J will therefore be attracted and the current will flow from the positive main through $l$ to the base of the switch J. Thence it flows through the cores and armature of this switch to the conductors 5, and thence through the armature windings $a^8$ in the reverse direction to that in which it previously passed through these windings. Thence the current flows through the conductors 3, to the armatures of the switches A and C and from the latter through the cores and base of the switch C to the conductor $l'$ and thence to the negative main as before. The various deflection receiving and transmitting instruments will then be caused to perform another step in their revolution. Similarly when the rotary hand switch $A^\times$ of the deflection transmitter is moved another step in the direction of the arrow, and reaches the segment $d$, the current is cut off from the switches C and J and their armatures resume their open position under the action of springs; then the current flows from the positive main to the ring $x$ as before. Thence it flows through the hand switch $A^\times$ to the segment $d$, and through the conductors $d'$, to the coils of the switch D. Thence it flows to the coils of the switch J and thence to the conductor $i$ and the negative main. The armatures of the switches D and J will thus be attracted and the current will flow from the positive main through the conductor $l$ to the base and cores of the switch J. Thence it will flow through the armature of this switch J to the conductors 5, and the motor armatures $a^9$ of the various deflection receiving and transmitting instruments; thence through the conductors 4, the armatures of the switches B, D, and the cores and base of switch D to the conductor $l'$ leading to the negative main. Thus another step will be imparted to the various deflection receiving and transmitting instruments. When the said rotary hand switch $A^\times$ is again turned another step, it will cut off the current from the switches D and J and their armatures will resume their open position under the action of springs, and it will join the ring $x$ and segment $a$ so that another cycle of operations like that above described will commence.

What we claim and desire to secure by Letters Patent of the United States is:—

1. In electric signaling apparatus, the combination with a source of electric supply, a dynamo electric device at the transmitting station having a counting device mechanically connected therewith, a similar dynamo electric device and counting device at each of the various receiving stations and a transmitter at the transmitting station, of an intermediate transmitter common to all the various receiving stations and controlled by the aforesaid transmitter and situated approximately in the center of the system comprising the dynamo electric receiving devices with which it is electrically connected for the purpose specified.

2. In electric signaling apparatus, the combination with a source of electric supply, a dynamo electric device at the transmitting station having a counting device mechanically connected therewith, a similar dynamo electric device and counting device at each of the various receiving stations, and a transmitter comprising a rotary hand switch coöperating with segmental contacts at the transmitting station, of a group of electro-magnetic switches situated approximately in the center of the system comprising the dynamo electric receiving devices with which it is electrically connected, and means whereby the movement of the rotary hand switch from one segmental contact to another causes the electro-magnetic switches to be energized in proper sequence for supplying current from the mains to the armature windings of the dynamo electric device at the transmitting station and the similar devices at the various receiving stations and a step by step rotation to be imparted to said armature substantially as and for the purpose specified.

3. In electric signaling apparatus, the combination with a source of electric supply, a dynamo electric device at the transmitting station having a counting device mechanically connected therewith, a similar dynamo electric device and counting device at each of the various receiving stations, and a transmitter comprising a rotary hand switch coöperating with segmental contacts at the transmitting station, of a group of electro-magnetic switches situated approximately in the center of the system comprising the dynamo electric receiving devices with which it is electrically connected, means whereby the movement of the rotary hand switch from one segmental contact to another causes the electro-magnetic switches to be energized in proper sequence for supplying current from the mains to the armature windings of the dynamo electric device at the transmitting station and the similar devices at the various receiving stations and a step by step rotation to be imparted to the armatures, and means situated at the sending station for changing the direction of the current through the dynamo electric devices, substantially as described.

4. In electric signaling apparatus, the combination with a source of electric supply, a dynamo electric device at the transmitting station having a counting device mechanically connected therewith, a similar dynamo electric device and counting device at each of the various receiving stations, and a transmitter comprising a rotary hand switch coöperating with segmental contacts at the transmitting station; of a group of electro-magnetic switches situated approximately in the center of the system comprising the dynamo electric receiving devices with which it is electrically connected, means whereby the movement of the rotary hand switch from one segmental contact to another causes the electro-magnetic switches to be energized in proper sequence for supplying current from the mains to the armature windings of the dynamo electric device at the transmitting station and the similar devices at the various receiving stations and a step by step rotation to be imparted to the armatures, a pair of electro-magnetic switches controlling the direction of the current through the dynamo electric device at the transmitting station and the similar devices at the various receiving stations and situated adjacent to the aforesaid group of electro-magnetic switches, and a hand switch situated at the transmitting station for opening and closing the circuit through the windings of said pair of electro-magnetic switches substantially as and for the purpose described.

5. In electric signaling apparatus, the combination with a source of electric supply, a dynamo electric device at the transmitting station having a counting device mechanically connected therewith, a similar dynamo electric device and counting device at each of the various receiving stations, and a transmitter comprising a rotary hand switch coöperating with segmental contacts at the transmitting station, of a group of electro-magnetic switches situated approximately in the center of the system comprising the dynamo electric receiving devices with which it is electrically connected, means whereby the movement of the rotary hand switch from one segmental contact to another causes the electro-magnetic switches to be energized in proper sequence for supplying current from the mains to the armature windings of the dynamo electric device at the transmitting station and the similar devices at the various receiving stations and a step by step rotation to be imparted to the armatures, a pair of electro-magnetic switches situated adjacent to the aforesaid group of electro-magnetic switches, a hand switch situated at the transmitting station, electric circuits connecting the windings of said pair of electro-magnetic switches with the said hand switch, electric circuits connecting the armatures of the said pair of electro-magnetic switches with the mains, electric circuits connecting the bases of said pair of electro-magnetic switches with the field windings of the dynamo electric device at the transmitting station and the similar devices at the various receiving stations, contact pieces with which the armatures of said pair of switches make electrical contact while the latter are in an unenergized condition, and electric circuits connecting the contact pieces to the bases of the opposite electro-magnetic switches substantially as and for the purpose described.

6. In electric signaling apparatus, the combination with a source of electric supply, a dynamo electric device at the transmitting station having a counting device mechanically connected therewith, a similar dynamo electric device and counting device at each of the various receiving stations, and a transmitter comprising a rotary hand switch coöperating with segmental contacts at the transmitting station, of a group of electro-magnetic switches situated approximately in the center of the system comprising the dynamo electric receiving devices, electric circuits connecting the windings of the said electro-magnetic switches with one of the mains and with the segmental contacts at the transmitting station, electric circuits connecting the rotary hand switch with the other of said mains, electric circuits connecting the cores of the electro-magnetic switches with the said mains and with the field windings of the dynamo electric device at the transmitting station and the similar devices at the various receiving stations, electric circuits connecting the armatures of said electro-magnetic switches together and with the armature-windings of said dynamo-electric device at the transmitting station and similar devices at the various receiving stations, the connections of the said electric circuits being such that the movement of the rotary hand switch from one segmental contact to another causes the electro-magnetic switches to be energized in proper sequence for supplying the current to the armature windings of the dynamo electric device at the transmitting station and similar devices at the various receiving stations substantially as and for the purpose specified.

7. In electric signaling apparatus, the combination with a source of electric supply, a dynamo electric device at the transmitting station having a counting device mechanically connected therewith, a similar dynamo electric device and counting device at each of the various receiving stations, and a transmitter comprising a rotary hand switch coöperating with segmental contacts at the transmitting station, of a group of two sets of electro-magnetic switches situated in a position approximately in the center of the system comprising the dynamo electric receiving devices, the number of switches in said group corresponding in number to the segmental contacts of the transmitter, additional electro-magnetic switches corresponding in number to that of the windings of the armatures of the dynamo-electric devices, electric circuits connecting the windings of the two sets of the electro-magnetic switches with the segmental contacts and, through their respective additional electro-magnetic switches, with one of the mains, electric circuits connecting the rotary hand switch with the other of said mains, electric circuits connecting the cores of the various electro-magnetic switches with the said mains and with the field windings of the dynamo electric device at the transmitting station and the similar devices at the various receiving stations, electric circuits connecting the armatures of the electro-magnetic switches together and with the armature windings of the dynamo electric device at the transmitting station and the similar devices at the various receiving stations, the connections of the said electric circuits being such that the movement of the rotary hand switch from one segmental contact to another causes the electro-magnetic switches to be energized in proper sequence for supplying the current to the armature windings of said dynamo electric device at the transmitting station and similar devices at the various receiving stations substantially as described.

8. In electric signaling apparatus, the combination with a source of electric supply, a dynamo electric device at the transmitting station having its armature formed with two pairs of pole pieces and two windings having a counting device mechanically connected with said armature, a similar dynamo electric device and counting device at each of the various receiving stations, and a transmitter comprising a rotary hand switch coöperating with segmental contacts at the transmitting station, of a group of two sets of electro-magnetic switches situated approximately in the center of the system comprising the dynamo electric receiving devices, the number of switches in said group corresponding in number to the segmental contacts of the transmitter, two additional electro-magnetic switches corresponding with the two windings of the armatures of the dynamo electric devices, one of said additional electro-magnetic switches being common to one of said sets of electro-magnetic switches and one common to the other of said sets, electric circuits connecting the windings of the two sets of the electro-magnetic switches with the said segmental contacts and, through their respective additional electro-magnetic switches, with one of the mains, electric circuits connecting the rotary hand switch with the other of said mains, electric circuits connecting the cores of the various electro-magnetic switches with the said mains and with the field windings of the dynamo electric device at the transmitting station and the similar devices at the various receiving stations, electric circuits connecting the armatures of the various electro-magnetic switches together in pairs, electric circuits connecting one pair to one armature winding of the dynamo electric device at the transmitting station and the similar devices at the various receiving stations, and the other pair to the other armature winding of said dynamo electric devices, electric circuits connecting the remaining pair, which belong to the additional electro-magnetic switches, in a circuit common to both of said armature windings, the connections of the said electric circuits being such that the movement of the rotary hand switch from one segmental contact to another causes the electro-magnetic switches to be energized in proper sequence for supplying the current to the armature windings of the dynamo electric device at the transmitting station and the similar devices at the various receiving devices, substantially as described.

9. In electric signaling apparatus, the combination with a source of electric supply, of a dynamo electric device situated at the transmitting station for transmitting range signals having a counting device mechanically connected therewith, a similar dynamo electric device and counting device also situated at the transmitting station for transmitting deflection signals, a dynamo electric device and counting device at each of the various receiving stations situated adjacent to the guns for indicating the range signals, a dynamo electric device and counting device at each of the various receiving stations situated adjacent to the guns for indicating the deflection signals, a transmitter comprising a rotary hand switch coöperating with segmental contacts at the transmitting station for transmitting range signals, a similar transmitter for transmitting deflection signals, and an intermediate transmitter controlled by the aforesaid transmitters and situated in a position approximately in the center of the system comprising the various range and deflection dynamo electric receiving devices with which it is electrically connected substantially as and for the purpose specified.

In testimony whereof we affix our signatures in presence of two witnesses.

CHARLES SALMON.
HENRY JAMES CREFFIELD.

Witnesses:
C. A. SALMON,
FRED. C. GOOD.